United States Patent [19]

Panella

[11] 3,802,466

[45] Apr. 9, 1974

[54] CLEAN-OUT PLUG ASSEMBLY

[75] Inventor: Paul Panella, Baltimore, Md.

[73] Assignee: Panella Industries, Inc., Baltimore, Md.

[22] Filed: Aug. 3, 1972

[21] Appl. No.: 277,779

[52] U.S. Cl. .................................. 138/89, 277/168
[51] Int. Cl. ............................................. F16l 55/10
[58] Field of Search.............. 138/89; 220/24 R, 45; 277/DIG. 2, 168

[56] References Cited
UNITED STATES PATENTS

| | | | |
|---|---|---|---|
| 1,170,182 | 2/1916 | Pape | 217/107 |
| 2,245,298 | 6/1941 | Proctor | 220/39 R X |
| 3,148,708 | 9/1964 | Panella | 138/89 |
| 3,081,102 | 3/1963 | Murray et al. | 277/168 |

Primary Examiner—George E. Lowrance
Assistant Examiner—Steven M. Pollard
Attorney, Agent, or Firm—Gustave Miller

[57] ABSTRACT

This is a combination clean-out plug assembly for a bald or no-hub clean-out pipe and also a method of assembling the clean-out ferrule assembly on the bald end area of the clean-out pipe.

The clean-out plug assembly includes a flanged ferrule having an internal diameter somewhat greater than the external diameter of the clean-out pipe bald end area. At one end, the ferrule has an end flange, which may have a threaded aperture having an internal, depending lip, the aperture being of a smaller diameter than the internal diameter of the clean-out pipe, so that the depending lip provides an inverted cup that may seat down over the end edge of the clean-out pipe. A conventional sealing plug is also provided for the flange aperture. Adjacent its other end, the ferrule has an internal circumferential groove.

A generally tubular gasket is provided to fit between the ferrule and the bald clean-out pipe end area. This gasket has a nosing adjacent each end separated by a thin tubular wall or neck, the thin wall or neck being of less thickness than the space between the ferrule and the pipe end area, while the nosings are of somewhat greater thickness than this space, and hence compress somewhat when the ferrule and gasket are inserted into the pipe end area. At the lower nosing, an external protuberance complementary to the ferrule circumferential groove is provided. On the upper or thin wall side of this lower nosing, an undercut is provided to improve its sealing quality, and on the other and lower side, the gasket flares outwardly away from this nosing and toward an outwardly extending gasket flange to fit against and abut the end edge of the ferrule.

The method of assembling this together includes cutting the inserted clean-out pipe to provide a bald end ending at the desired grade. The gasket is inserted into the ferrule, the thin connecting wall making it fairly easy to insert it to the proper position with the protuberance seated in the circumferential ferrule groove, and the gasket flange abutting the ferrule end edge. Then, either the gasket nosings are internally lubricated, or the bald pipe end is lubricated, or both are lubricated. The assembled ferrule and gasket are then installed on the bald end pipe area by manually working it down over the pipe end, the internal flared end of the gasket guiding the gasket easily down, compressing the first nosing, then manually working it down further until the second nosing is encountered, and, if it is too difficult to manually push it down further, a conventional plumber's lead hammer is used to tap the ferrule and gasket down further to seat on the pipe end edge, completing the assembly at the desired grade level. Obviously, if a clean-cut must have a temporary grade, the same structure and method is used, and the pipe is again cut at the permanent grade when it is determined, and either the same ferrule and gasket are removed from the cut end and installed at the permanent grade, or, to save time on the job, a new ferrule and gasket may be provided, and the old ferrule and gasket may be salvaged at the plumber's shop.

2 Claims, 3 Drawing Figures

PATENTED APR 9 1974 3,802,466

CLEAN-OUT PLUG ASSEMBLY

OBJECTS OF THE INVENTION

It is an object of this invention to provide a clean-out plug assembly that is an improvement over applicant's prior U. S. Pat. No. 3,148,709 in particular and over the prior art in general, by providing an assembly and an improved method of installing the assembly that is faster, easier and much less expensive to install than the devices of applicant's prior patent and the prior art in general.

A further object of this invention is to provide an improved method of installing a clean-out plug assembly that is less time consuming than previously possible, that saves the installer's time, that is easier and quicker to install than possible with previous well known clean-out assemblies, even including applicant's prior assembly of his above-mentioned patent.

A further object of this invention is to provide a novel combination of a generally tubular compression gasket between the ferrule and the bald end clean-out pipe whereby an improved and fast method of installing the clean-out plub assembly is possible, taking the place of the expensive lead and oakum joint usually and expensively provided, and also taking the place of the O-ring of applicant's prior patent, thus enabling the clean-out plug to be manually placed over and manually pushed down onto the bald end sufficiently so that it may then be easily tapped into final position by the conventional lead hammer. With the O-ring gasket of the prior patent, it is difficult to get the plug assembly placed initially on the bald pipe end and it is much more difficult to get the clean-out plug assembly started down on the pipe; it must be tapped with the lead hammer from the start, making it difficult to start it onto the bald pipe end.

A further object of this invention is to provide an improved seal between the clean-out plug assembly and the bald pipe end by providing a generally tubular compression gasket that makes it both easier to install than the O-ring type and also provides a much better seal between the bald pipe end and the ferrule assembly.

BACKGROUND OF THE INVENTION

Applicant's prior U. S. Pat. No. 3,148,708 was an improvement over the conventional prior cleanout plug assemblies which, in general, used a bell end clean-out pipe and a lead and oakum seal between the clean-out plug assembly and th bell end pipe, Applicant's prior patent shows a substantial improvement over this prior art by providing an assembly for a bald end cleanout pipe, as described in such patent, but it uses an O-ring seal, which was difficult to install; it was hard to get it started onto the bald pipe end, and the single line contact seal provided thereby was not too perfect.

SUMMARY OF THE INVENTION

With this invention, a tubular compression gasket, having a thin neck connecting enlarged nosings and an outwardly flared end, is used between the bald pipe end and the clean-out plug assembly. The tubular gasket internal nosings are lubricated prior to installation, and/or the bald pipe end is lubricated. This provides for an improved method of assembly, As a result of such combination, the plug assembly with its lubricated tubular compression gasket, nosings and flared entrance and the lubricated bald pipe end, the flared entrance and first nosing are readily manually pushed down over the bald pipe end to the second nosing, so that the installation may be readily completed by tapping it into final position with a conventional plumber's lead hammer, thus saving the plumber a great deal of time in the installation, and, of course, cutting down expense for all involved in the installation. By using a generally tubular compression gasket with two nosings, a pair of seals are provided, which is much more effective than the O-ring line seal of the prior patent above mentioned. With a generally tubular compression gasket, a better seal is provided even though the gasket nosings may be under much less compression than the O-ring gasket which provides only substantially a single line contact seal. It is a decided improvement over the ferrules and seals shown in prior U. S. Pats. Nos. 616,929 and 1,832,183, which are of the lead and oakum type seals.

BRIEF DESCRIPTION OF THE FIGURES

With the above and related objects in view, this invention consists in the details of construction and combinations of parts, and will more fully be understood from the following description, when read in conjunction with the accompanying drawing, in which.

DETAILED DESCRIPTION OF THE INVENTION

Figure 1:
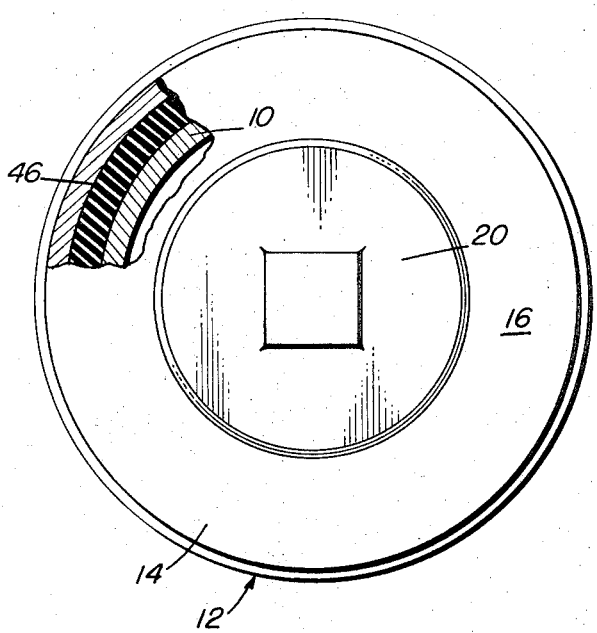
FIG. 1 is a top end view of the bald end clean-out pipe plub assembly, partly broken away on line 1—1 of FIG. 2.

There is shown at 10 a bald end clean-out pipe on which the clean-out plug assembly 12 of this invention has been installed. The assembly 12 includes a flanged ferrule 14 having a flange 16 across the end thereof. While this flange 16 may extend entirely across the end, it may be provided with a threaded aperture 18 for receiving a threaded plug 20, usually of brass, while the ferrule 14 may be of cast iron or of material similar to that of the material of the clean-out pipe 10, which is usually, but not always, of cast iron. As shown, the diameter of the threaded aperture 18 is somewhat less than the internal diameter of the clean-out pipe 10, and, in addition, the aperture 18 extends down into a depending lip 22. This lip 22 provides an inverted cup that fits down over the end 24 of clean-out pipe 10, and, as shown, the bottom 25 of the inverted cup may fit snugly against the end 24 of the clean-out pipe 10.

The internal diameter of the ferrule 14 is sufficiently larger than the external diameter of the clean-out pipe that a generally tubular gasket 26 of suitable flexible material, such as "neoprene" or the like, may fit between the ferrule 14 and the bald end area of clean-out pipe 10. This gasket 26 somewhat resembles that shown in U. S. Pat. No. 3,081,102, but differs therefrom in some important details, particularly essential to the installation method of this invention. In such patent, the "exterior surface of the tubular gasket resides closely adjacent the interior surface of the bell (or ferrule) and preferably engages the same throughout its length." In this invention, the tubular gasket 26, between its end, has a thin neck 28 spaced from both the internal surface of the ferrule 14 and the external surface of the bald pipe 10 which is substantially thinner than the space between the exterior surface of pipe 10 and the interior surface of ferrule 14. Adjacent the ferrule end 30, which is somewhat thickened, if necessary, as shown at 32, there is provided an internal circumferential groove 34 into which internally extends a complementary circumferential protuberance 36 at the end of gasket neck 28. An internal nosing 38 extends inwardly from the neck 28 and is undercut at 42, so that, when assembled, it will bear somewhat against the exterior surface of the clean-out pipe 10. Beyond or below the protuberance 36, the tubular gasket has formed thereon an outwardly extending flange 40 to fit and abut against the end edge 30 of ferrule 14, helping the protuberance 36 to hold the gasket 26 in proper position as the gasket 26, already positioned in the ferrule 14, is assembled over the clean-out pipe bald end 24. At the interior end of the gasket 26, the neck 28 curvedly connects smoothly to an annular nosing 46 which is substantially smoothly curved in cross-section on its outer surface at 48, and is substantially cylindrical at 50 complemenary to the surface of the cylindrical clean-out pipe. However, the thickness between the curved exterior at 48 and the cylindrical interior at 50 is somewhat greater than the space between the exterior of the clean-out pipe 10 and the interior surface of the ferrule 14, and thus the nosing 46 is sufficiently compressed to provide a seal. The nosing 38, of less internal diameter than pipe 10, flares outwardly at 52 toward flange 40, as shown, facilitating the initial movement of the ferrule 14 and gasket 26 down over the pipe end.

OPERATION AND METHOD OF ASSEMBLY OF THE INVENTION

The method of assembly and operation of the invention is as follows. The ferrule 26 is first inserted in the ferrule 14 until its protuberance 36 enters the circumferential groove 34 in ferrule 14 and the gasket flange 40 abuts the end 30 of ferrule 42. The nosing 48 is extended within the ferrule 14 without difficulty due to the thin neck 26 permitting it to be flexed inwardly if necessary during the installation of the gasket 26 in ferrule 14. Then, before the ferrule 14 and gasket 26 are assembled over the end 24 of clean-out pipe 10, it is lubricated, either on the interior of the nosing 46, the nosing 38 and the internal flare 52, with liquid or detergent soap or similar lubricant material, or the clean-out pipe end area is lubricated a distance from and toward its end at least the length of the ferrule, or both are lubricated. Then, due to he slight and lubricated contact between the lower nosing 38 and the flare 52, the assembled ferrule 14 and gasket 26 are easily manually pressed down over the bald pipe end 24 at least as far as the nosing 46, which must be compressed as the ferrule 14 and gasket are pushed toward final assembled position.

Being done manually, it is easy and quick to thus place the ferrule and gasket for about two thirds of its length, until the surface 50 of nosing 46 starts to contact the pipe 10. Then, if too difficult to manually push it all the way in this partially assembled position, the ferrule flange 16 is tapped with a hammer, such as a conventional plumber's lead hammer, to easily and quickly force it down over the clean-out pipe end 24 as shown. While the flange 16 may be imperforate, if it is provided with the threaded aperture 18, then the brass plug 20 is installed by use of a wrench.

Figure 3:
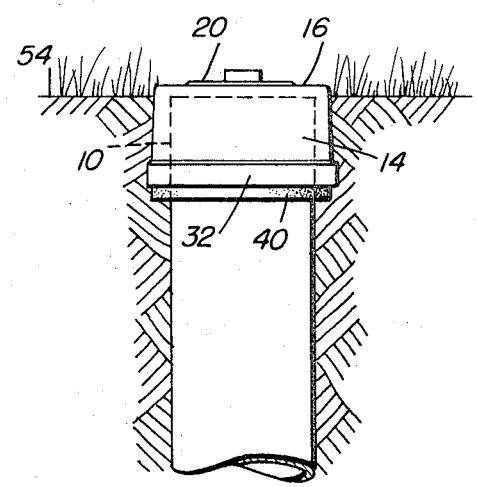
FIG. 3 is an elevational view of the pipe and assembly in grade position.
Figure 2:
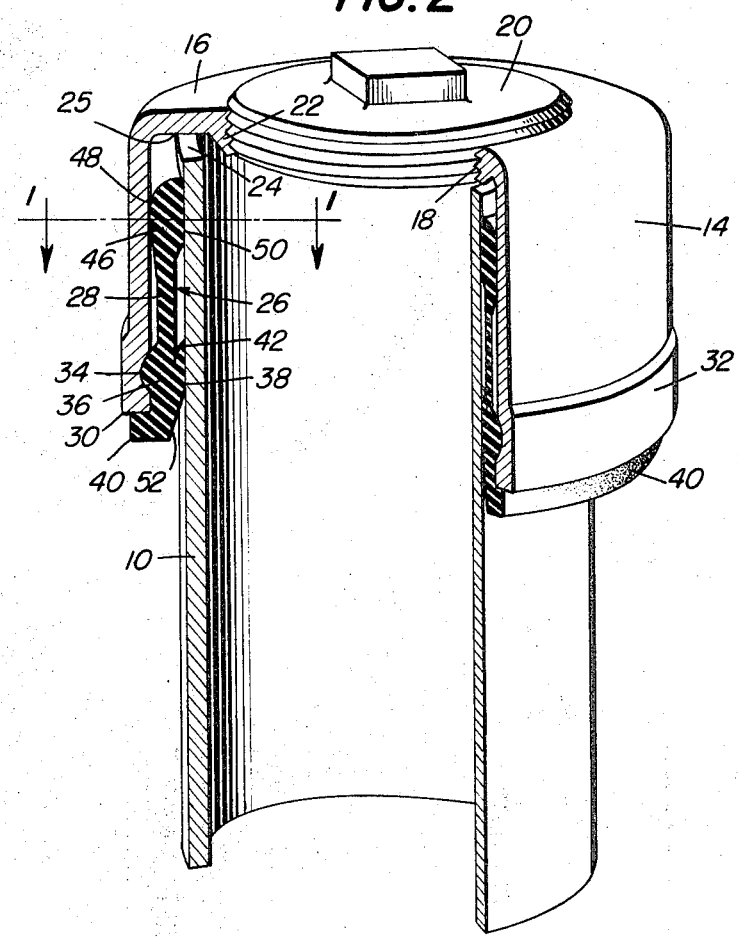
FIG. 2 is a perspetive view of the clean-out pipe and plug assembly, partly in section.

Before the ferrule 14 and gasket 26 are assembled on the clean-out pipe in permanent grade position, as shown in FIG. 3, it may be used as a temporary ferrule, assembled in the same manner, when the clean-out pipe extends about the permanent grade, before the permanent grade is set. If there is a bell on the top end of the clean-out pipe, it is snapped off with a conventional cast iron cutter, providing a bald-pipe end area, on which the ferrule and gasket are positioned as just described. Then, when the permanent grade 54 is determined, the clean-out pipe 10 is snapped off at the permanent grade 54, before or after which the ground about the grade is cleared to permit the ferrule 14 to be put in position. Then the ferrule and gasket are removed from the snapped off pipe, or, if desired, to save time, another similar ferrule and gasket are positioned as above set forth on the clean-out pipe 10 at a permanent grade 54, and the ferrule and gasket on the snapped off pipe portion may be salvaged for reuse back at the shop rather than in location.

With this method and construction, the costs are reduced considerably, the plumber's time, the most expensive item in the operation, is greatly reduced, and a more satisfactory job is provided than with conventional procedures and structures. Should any pressure leak from pipe 10 past nosing surface 50, it will force undercut 42 more tightly against pipe 10, and similarly force protuberance 42 more tightly into its groove 34, thus insuring against any leakage of sewer gases.

ABSTRACT OF THE DRAWINGS 10 bald end clean-out pipe
12 plug assembly
14 flanged ferrule
16 ferrule flange
18 flange threaded aperture
20 threaded brass plug
22 depending aperture lip
24 end edge of bald clean-out pipe 10
25 bottom of inverted cup in flange 16
26 flanged ferrule gasket
28 gasket thin neck
30 ferrule end edge
32 thickened end of ferrule 14
34 internal circumferential groove
36 protuberance to fit in 34
38 lower internal nosing
40 flange on extenal end of gasket 26
42 undercut between lower nosing 38 and thin neck 28
46 upper end nosing of ferrule 26
48 curved outer surface of nosing 46
50 cylindrical inner surface of nosing 46
52 outward flare between lower nosing 38 and gasket flange 40
54 completed grade Although this invention has been described in considerable detail, such description is intended as being illustrative rather than limiting, since the invention may be variously embodied.

Having thus set forth and disclosed the nature of this invention, what is claimed is:

1. For use in a combination clean-out plug assembly for a bald clean-out pipe (10); a ferrule (14) having an internal diameter somewhat greater than the external diameter of the clean-out bald pipe end area (10), one end of said ferrule (14) having an inwardly extending flange (16), said flange providing an inverted cup (25) to extend down over the clean-out bald pipe end edge (24), said inverted cup having an inner lip (22) of lesser diameter than the internal diameter of the clean-out bald pipe end edge (24) to extend downwardly somewhat with in the bald pipe end (10), the other end (30) of said ferrule having a somewhat external thick end (32), said thick end having an internal circumferential groove (34) spaced from but adjacent its lower end edge (30), and in combination, an elongated somewhat tubular gasket (26) having enlarged end area nosing (38,46) of greater thickness than the space between the ferrule (14) and the bald pipe end area (10), one enlarged gasket area having an externally extending protuberance (36) complementing said ferrule internal circumferential groove (34), the other enlarged gasket area (46) having a curved outer surface (48) and a thickness somewhat greater than the space between the internal diameter of said ferrule (14) and the external diameter of the clean-out bald pipe end area, said enlarged ends (36,46) of said gasket (26) having their internal nosings (38,50) of a lesser internal diameter than the external diameter of the bald pipe and area (10), a thin neck (28) spaced from both the internal surface of said ferrule (14) and the external surface of the bald pipe end area (10) connecting both enlarged end areas (38,46) of said gasket (26), an undercut area (42) connecting said protuberance internal nosing (38) to said thin neck (28), the protuberance end of said gasket (26) having an outwardly extending flange (40) abutting the lower end edge (30) of said ferrule (14), and internal entrance flare (52) connecting the gasket flange (40) to its adjacent nosing (38).

2. The ferrule (14) of claim 1, said cup inner lip (22) being internally threaded, and a sealing plug (20) removably threaded in said cup inner lip (22).

\* \* \* \* \*